United States Patent Office 2,790,776
Patented Apr. 30, 1957

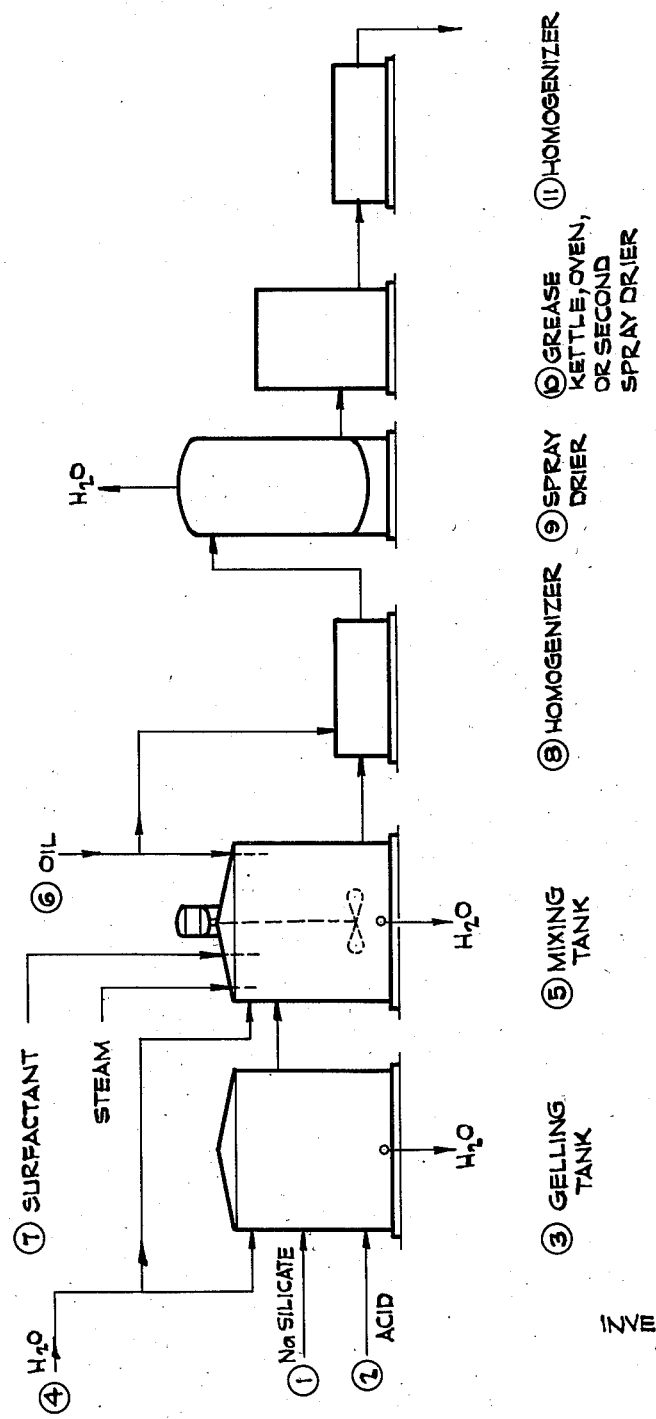

2,790,776

WATER-RESISTANT GELS AND THEIR MANUFACTURE

William E. Savage, San Leandro, and Walter H. Peterson, Richmond, Calif., assignors to Shell Development Company, Emeryville, Calif., a corporation of Delaware Application August 26, 1952, Serial No. 306,342

10 Claims. (Cl. 252—28)

This invention relates to the preparation of water-resistant gels suitable for the preparation of grease compositions and the like. More particularly, it pertains to an improved process for the preparation of grease-forming compositions comprising an oil, an inorganic colloid and a hydrophobic surface-active agent.

Oleaginous compositions such as greases and drilling fluids have been prepared by using inorganic colloids or gelling materials prepared therefrom as a thickening agent. Typical materials within these classes include silica gel and onium-clays. The preparation of gels suitable for effective thickening of oil or oleaginous fluids has heretofore been difficult and limited to relatively expensive process steps. For example, in the case of silica and other inorganic amorphous colloids, three possible alternative processes were available. These comprise aerogel formation, solvent transfer processes and the so-called "direct transfer process." The requirement in all preparations of inorganic amorphous colloids for grease preparation and the like is that the product be formed in a sufficiently porous or expanded state as to present a large surface area capable of retaining oil somewhat in the nature of a sponge.

Aerogel formation is an expensive process. It requires the use of an autoclave and recovery of relatively expensive volatile fluids such as alcohols and ketones. Solvent transfer, wherein the water present in a hydrogel is replaced by a water miscible organic solvent, such as acetone which in turn is replaced by oil or an intermediate oil-miscible solvent, requires extensive handling which should be avoided if possible. An improvement on either of these processes comprises the direct transfer process wherein a hydrogel of the inorganic colloid is modified by the addition of a hydrophobic surface-active agent and subsequently by the incorporation of oil. Under these circumstances a large proportion of the water present in the hydrogel separates from the mixture and the product is subsequently further dried. It will be understood by experts in the grease art that this process requires special equipment not normally available in a grease compounding plant. Consequently, the latter process, while it is an improvement on the first two alternatives, still possesses an inherent shortcoming which heretofore has not been removed.

A more satisfactory process for the preparation of gels would comprise a spray drying process but it was found that simply spray drying a hydrogel did not produce a gel structure which was suitable for the preparation of grease compositions since the porosity of the spray-dried material was relatively low and consequently the yield of the grease prepared therefrom also was low. An improvement upon this proposed process comprised the incorporation of a high molecular weight amine in the hydrogel prior to spray drying. While the resulting product exhibited some advantage over the spray drying of unmodified hydrogels, the resulting particles still did not have a satisfactory bulk density or surface area as evidenced by the yield of the grease which was too low to be satisfactory.

In addition to the problems encountered in the preparation of suitable grease-forming gels, difficulties have also been encountered in the actual steps of grease preparation wherein the gel is to be dispersed in the main body of the lubricating oil. It has been found that an extreme degree of shearing action is necessary in order to satisfactorily disperse the gel throughout the oil and thus create a grease structure.

It is an object of the present invention to improve the process for the preparation of gels suitable for the preparation of greases, drilling fluids and the like. It is a further object of this invention to provide improved compositions for gelling or thickening oleaginous fluids. It is a further object of this invention to provide an improved process for the preparation of greases and for thickening oleaginous fluids. Other objects will become apparent during the following discussion.

The attainment of the objects of the invention will be made clear from the description thereof, which will be made in part with reference to the accompanying drawing, the sole figure of which illustrates a specific set of equipment for use in the described process.

Now, in accordance with the present invention, it has been found that the presence of a certain limited amount of oil together with a hydrophobic surface-active agent and an inorganic colloid enables the use of spray drying to produce a product capable of substantially improved gelling power when dispersed in a lubricating oil or other oleaginous fluid.

Furthermore, in accordance with this invention, is has been found that the additional presence of a relatively volatile polar liquid, e, g., water, or alcohol in the solid spray dried product substantially improves the ease with which the latter is subsequently dispersed in an oleaginous fluid. Hence, in carrying out a grease-forming preparation according to the latter process, the composition is heating with a lubricating oil at a temperature at least 10° C. above the boiling point of the volatile liquid. Under these conditions the latter evaporates and in so doing creates copious quantities of gaseous products which materially aid in uniformly dispersing the gel throughout the oil.

In further accordance with the invention, milling of the four component compositions, namely, inorganic gel, surfactant oil and water, to form a partly cohesive but somewhat friable mass, creates an easily dispersible product which can be incorporated in a lubricating oil by simple stirring, thus eliminating or materially diminishing the shearing action normally required for grease formation.

The process broadly comprises the formation of a hydrogel and the incorporation of a hydrophobic surface-active agent in the gel together with a limited amount of an oleaginous fluid followed by spray drying of the mixture so formed. As pointed out hereinbefore, if spray-dried, it is possible to obtain grease compositions therefrom but the product is not suitable due to its relatively low gelling or thickening capacity. In accordance with the present invention, therefore, it was found that the addition of an oleaginous fluid in an amount between about 50% and 150% by weight, based on the inorganic gelling agent prior to spray drying, results in the production of a spray dried product having substantially improved gelling or thickening capacity. Within this range of oleaginous fluid addition, optimum results are obtained particularly when spray drying inorganic amorphous colloids if the proportion of oil is between 75% and 125% by weight of the inorganic colloid. The oleaginous fluid is preferably one having the volatility and viscosity characteristics of lubricating oils such as mineral oil. However, as pointed out hereinafter, the invention is not to be confined to the use of mineral oils since other equivalent materials are suitable for the present purpose.

Hence, one of the compositions of the present invention comprises a mixture of the inorganic gelling agent modified by the presence of 10–150 parts by weight of a hydrophobic surface-active agent for each 100 parts by weight of the inorganic gelling agent and 50–150 parts by weight of an oleaginous fluid for each 100 parts by weight of the inorganic gelling agent. The preferred composition ranges comprise 25–75 parts by weight of the hydrophobic surface-active agent and 75–125 parts by weight of the oleaginous fluid based on 100 parts by weight of the amorphous inorganic gelling agent; or 80–140 parts of surfactant for each 100 parts of a high base exchange clay. Preferably, from 30 to 100% of the surface area of the gel bears a monomolecular layer of the surfactant.

In carrying out the process for the preparation of the above compositions it has been found suitable to form a hydrogel of the inorganic gelling agent and thereafter mix oil and the surface-active agent therewith. This mixture is preferably homogenized prior to spray drying since it has been determined that the average particle size and uniformity of the product is more satisfactory if homogenization has been utilized. Following this optional step of homogenization, the mixture is then passed through a spray drier which may be any one of a number of well-known types of equipment such as a drier containing spinning cones, spinning discs or the so-called two-fluid type nozzles. The latter type of equipment is preferred but the spinning cone also has given highly satisfactory results. Venturi openings may be employed as well. During the spray drying operation it is preferred that the temperature be restricted to between about 50° and 100° C. since above the latter temperature the gel particles sinter and form gritty agglomerates resulting in an abrasive final product. Below about 50° C. the rate and degree of water removal is too low to be satisfactory. In the case of the two-fluid type of nozzle it is preferred practice to employ pressures in the order of 10–100 pounds per square inch when spray drying hydrogels containing from about ⅛ to 1% by dry weight of the inorganic gelling agent. When utilizing the cone type of spray drier, speeds between 2500 and 15,000 R. P. M. are satisfactory and this type of equipment has the advantage of being able to handle gels of higher solids content, up to about 5% by weight.

Under the conditions described above, which should not be taken as critically limiting but merely preferred, the product obtained still retains an appreciable quantity of water in the order of 2–50 parts per hundred parts of inorganic gelling agent. This residual water may be removed by a second spray drying operation, oven drying or by other means if so desired. However, substantial advantages have been found for its retention in the gelling composition until the latter is incorporated with the major amount of oleaginous fluid to be utilized in the final product. As more particularly described hereinafter, the presence of the water can perform two important functions: If this composition is milled, as described later, the water together with the oil causes a certain degree of cohesiveness resulting in a cohesive but friable product having exceptional dispersing properties. Moreover, the presence of the water is especially desirable when the spray-dried composition is to be utilized in the ordinary grease-making kettles and the like. The latter equipment is usually designed for the saponification of fatty oils with caustic or other base. In carrying out the process of preparing greases under such circumstances, the soap is usually formed in situ by the addition of aqueous caustic to the lubricating oil having fat or fatty oil incorporated therewith. This causes saponification of the latter and evaporation of water occurs.

Turning now to the incorporation of inorganic gelling agents, such as silica and the like, it has been found to be unaccountably difficult to disperse the latter through- out a lubricating oil and it has been necessary to utilize a high degree of shearing action in order ot promote a satisfactory grease structure. However, in the course of making the present invention, it was discovered that the gelling compositions containing the residual water referred to hereinbefore dispersed surprisingly easily in a lubricating oil and thus required a reduced amount of dispersion operation such as milling and the like.

In accordance with one phase of this invention, therefore, it is a preferred practice to utilize the spray dried, but still partially hydrated material, in a grease-forming process wherein the gelling composition prepared by spray drying is added to a lubricating base at a temperature approximately at least 10° C. higher than the boiling point of water. Under these circumstances the water rapidly volatilizes and (in the formation of steam vapors) apparently causes a bursting or at least rapid dispersal of the gel-forming particles resulting in a substantially greater ease of grease formation. Summarizing the compositions utilized in such a process, the water-containing grease-forming composition comprises from about 10–100 parts of a hydrophobic surface-active agent, from about 50–150 parts of a lubricating oil and from about 2–50 parts of water for each 100 parts by weight of the inorganic gelling agent. A preferred composition found to have optimum dispersal properties comprises one in which the ingredients comprise 25–75 parts of hydrophobic surface-active agent, 75–125 parts lubricating oil and 10–40 parts of water for each 100 parts of inorganic gelling agent.

In further accordance with the present invention, a still greater advantage in the use of the latter type of composition is encountered when it is subjected to a preliminary milling operation prior to incorporation in the main body of the lubricating oil. When the product comes out of the spray drier it is in pulverulent form which has a greasy feel but which does not readily agglomerate. By passing this powdery composition through a paint mill, or other milling means, a plasticizing effect occurs causing partial cohesion of the particles to form a somewhat plastic but still friable mass which can be broken into crumbs. For some reason as yet undetermined these friable particles can be dispersed in lubricating oil to form a grease without the necessity of resorting to excessive milling or other ardous operations. This "pre-milling" is a substantial advantage to the normal grease manufacturer since it largely reduces the mechanical handling which is required to produce a grease composition.

Referring now to the single figure of the drawing, a typical preparation of greases and grease-forming compositions is illustrated. It will be understood that this figure is given to exemplify the process and products and is not intended to be restrictive in any of the specific steps. According to the process given in the figure, sodium silicate from a storage tank 1 and acid from a storage tank 2 are mixed in a gelling tank 3 together with sufficient water from a source 4 to form a gel having desired solids content. The solids content normally utilized in the preparation of grease-forming gels is between 2% and 10% by weight of the water. After permitting gelation to take place in accordance with conditions well-known in the art, water may be drained and the concentrated gel moved to a mixing tank 5 for the introduction of oil from a source 6, surfactant from a source 7 and steam or water. The addition of steam serves the double purpose of causing agitation of the mixture and of introducing heat for the purpose of melting the surfactant and aiding in the dispersal of the oil and surfactant uniformly throughout the gel particles. It is usually possible to drain some of the water from the product at this point. It is preferred, as referred to hereinbefore, to homogenize this product such as by passing it through a pump and orifice arrangement 8. Alternatively, the oil may be incorporated during or following homogenization instead of during the mixing step. However, if homogenization is utilized it is preferred that the oil be added in the mixing tank 5 rather than in a subsequent stage. From this point the mixture passes to the spray drier 9 wherein the operation of forming the powdery product occurs. As stated above, this product under the preferred operating conditions still retains a certain amount of water which for some grease-forming processes it is advantageous to retain. If, however, an anhydrous composition is desired the powder may be oven-dried or sent through a second spray drier for this purpose. If water is to be left in the composition, as described hereinbefore, the product may be packaged or sent to a grease-forming kettle for the preparation of grease compositions.

As stated hereinbefore, the present process applies not only to grease-forming compositions but also to thickening compositions which may be utilized in the formation of drilling fluids, lithographic inks and the like, wherein an oleaginous base requires either thickening or gelling. Moreover, the generic concept of the invention includes the preparation of thickening compositions wherein the thickening agent is either an inorganic amorphous colloid, a clay, or waterproofed amorphous colloids such as partially esterified silica and mixtures of these classes of thickening agents.

GREASE-FORMING GELS

The greases should contain from about 1% to about 20% of a grease-forming gel, based on weight of the total composition. As intimated hereinbefore, grease-forming gels are divided into two main classes. These include the amorphous substances and the crystalline materials capable of gel formation. Amorphous gels especially suited for use in this invention include especially the inorganic oxides, hydroxides, sulfides, sulfates, carbonates and phosphates. The most typical members having wide utility are silica, alumina, magnesia, lime, copper sulfide, calcium sulfate and manganese phosphate. These may be employed either as the single material or more preferably as mixtures thereof so as to obtain optimum combinations of properties peculiar to each species. For example, it has been found that greases gelled with silica are less effective for preventing corrosion than greases gelled with mixtures of magnesia and silica. In place of magnesia, silica may be mixed or co-precipitated with other polyvalent metal oxides capable of colloidal dispersion such as alumina and lime. Preferably, the amount of polyvalent metal oxide in admixture with silica is present in an amount greater than about 3% but less than about 40% based on the total weight of the inorganic microgel.

The second category of grease-forming materials contemplated for use in the compositions of this invention are those which in themselves are not usually capable of grease formation due to their low surface area and crystalline structure but which may be modified so as to provide them with suitable grease-forming properties. This class includes especially natural and synthetic clay-like substances which are modified by having a hydrophobic surface-active agent adsorbed on the swollen clay.

The clays which are useful as starting materials in accordance with this invention are those exhibiting substantial base-exchange properties and particularly those exhibiting comparatively high base-exchange properties and containing cations capable of relatively easy replacement. These clays (particularly contemplated by the specification and the claims) include the montmorillonites such as sodium, potassium, lithium and other bentonites, including Wyoming bentonite, magnesium bentonite, Hectorite and saponite; Attipulgite, zeolites and fuller's earths, particularly those of the Georgia-Florida type. These clays are characterized by an unbalanced atomic structure or unbalanced crystal lattice and are believed to have negative charges which are normally neutralized by inorganic cations. As found in nature, therefore, they exist as salts of the weak clay acid with bases such as the alkali or alkaline earth metal hydroxides.

The base-exchange capacities of the various clays enumerated run from about 15 to about 100 milli-equivalents of exchangeable base per 100 grams of clay. The montmorillonites have comparatively high base-exchange capacity, usually between 60 and 100. Generally, the clays of higher base-exchange capacity (above about 25) are particularly useful where high adsorption of an organic base is desired.

The oleaginous fluid to be incorporated in the grease-forming gel compositions or to be used as the main oleaginous fluid in the final compositions eventually employed as greases, drilling fluids and the like, may be either mineral oils or synthetic lubricants whose identity and properties are well-known. If mineral oils are utilized they are usually within a viscosity range varying within the range of about 50–2000 SUS at 100° F. and have a viscosity index from about 0 to about 80. In addition to the typical mineral lubricating oils, synthetic hydrocarbon materials may be employed such as cracked wax olefins, platformed wax fractions, polymerized lower olefins and synthetic materials such as the following aliphatic esters of dicarboxylic acids of which bis(2-ethylhexyl)sebacate is typical. Esters of phosphorus acids are likewise suitable such as tricresyl phosphate, trioctyl phosphate and the corresponding phosphonates, phosphinates and phosphine oxides. Another typical class of synthetic lubricant comprises the oxyalkylene polymers such as the polymers of propylene oxide, the copolymers of ethylene oxide and propylene oxide, the polymers of trimethylene glycol and esterified or etherified derivatives of such polymers. Greases may be prepared by the use of halogenated organic compounds particularly the halocarbons such as fluorocarbons.

As stated hereinbefore, these compositions should contain a hydrophobic surface-active agent. These may be either cationic, anionic or non-ionic agents which are well-known in the art. They should be absorbed on the surface of the gel particles. Reference is made to Stross patent U. S. 2,554,222 which describes the general class of cationic hydrophobic surface-active agents useful in these compositions and to U. S. 2,573,650 which gives details of hydrophobic hydroxy-containing surfactants suitable for waterproofing the present compositions. Typical anionic substances are referred to in application Serial No. 91,229 filed May 3, 1949, by Fred H. Stross and Stanley T. Abrams, now Patent No. 2,599,683. Reference is furthermore made to U. S. application Serial No. 133,962 to Walter H. Peterson, now Patent No. 2,623,852, which discloses a highly preferred type of cationic hydrophobic surface-active agent comprising hydroxy polyamines such as those formed by partial amidization of the condensation products of epichlorohydrin and ammonia. A still further type of surface-active agent which is useful for improving the water-resistant properties of the subject grease-forming compositions and greases comprises the polymeric silicones such as those formed by condensation and polymerization of dimethyldichlorosilane on the surfaces of the gelled particles. In addition to these classes of hydrophobic agents other materials suitable for this purpose include alkyd resins.

The description given hereinbefore of the partially wet grease-forming composition referred to water as the volatile liquid aiding in the latter step of actual grease formation. It is not necessary to employ water for this purpose since other oil insoluble polar relatively volatile materials may be utilized in place of, or in addition to, water such as low boiling alcohols, ketones, esters and the like including methanol, ethanol, and acetone. Preferably these volatile liquids have boiling points at atmospheric pressure below about 125° C. and preferably below 100° C. but are relatively non-volatile at ordinary room temperature.

In addition to the essential ingredients in these grease-forming compositions and greases, other modifying substances may be utilized such as anti-oxidants, anti-corrosion agents, extreme pressure agents and the like.

The following examples illustrate the advantages to be gained by utilizing the processes and products of the present invention.

*Example I*

A silica hydrogel having 3% solids content was spray dried at temperatures ranging from 80° C. to 310° C. using either a two-fluid nozzle or a spinning cone, the latter being rotated at speeds between 3000 and 12,500 R. P. M. The product was oven dried to remove residual water and was then dispersed by milling in lubricating oil to produce a grease structure. It was necessary to employ 30% by weight of the silica to obtain a grease having a micropenetration of 140 dmm. The maximum particle size in the grease was 25 microns. A parallel process was performed in which the silica hydrogel was modified by the addition of 40% by weight of a hydrophobic surfactant based on the solids content of the hydrogel and drying was conducted by spraying from a two-fluid nozzle at an air pressure of 10 lbs. per square inch gage with an inlet temperature of 200° C. and an outlet temperature of 80° C. The resulting product was oven dried and dispersed in lubricating oil. 18% by weight of the silica based on the total grease was required to give the same consistency grease. The maximum particle size was 10 microns. A third comparative test was made in which the hydrogel was modified by addition of 40% of the same surfactant and 100% of a mineral lubricating oil, both based on the solids content of the hydrogel. The product was spray dried and then substantially dehydrated in an oven after which it was dispersed in lubricating oil to form a grease. Only 10.3% by weight of the grease composition of the silica was required to give a grease of consistency substantially equal to that of the two greases just described. Moreover, the maximum particle size was less than 5 microns. When the latter process was repeated using only 40% mineral oil, based on the silica prior to spray drying, the resulting grease made from the product so obtained required 13.4% silica to reach the same consistency. The surfactant employed was the one-third amide of tallow fatty acids and the condensation product of epichlorohydrin and ammonia.

*Example II*

A grease-forming concentrate was prepared in accordance with the third grease described in Example I which contained silica, surfactant (stearic acid) and oil but the oven-drying step was omitted thus leaving 10% water, based on the silica, in the powdery product. This product was dispersed in lubricating oil to form a grease of similar consistency to those described above. It was found that in the presence of the water dispersion was appreciably faster and that the milling requirement to reach maximum consistency was greatly reduced.

*Example III*

The product prepared in accordance with Example II was pre-milled to obtain a partly plasticized but generally friable mass which was no longer in powder form but which, when added to lubricating oil and stirred vigorously, resulted in dispersion requiring only light milling operation to obtain a grease. Dispersal of powdery products which have not been pre-milled always requires extensive milling of the entire final grease composition in order to attain a suitable grease consistency.

*Example IV*

When the product prepared according to Example II is added to oil at a temperature of approximately 130° C. and vigorously stirred, the residual water rapidly evaporates and in so doing causes dispersion of the grease-forming concentrate throughout the oil. By this means the requirement for milling to produce a grease structure was substantially reduced.

We claim as our invention:

1. A process for the preparation of an oil dispersible water-resistant gel comprising mixing a hydrogel of an inorganic amorphous colloid with a hydrophobic surface-active agent and from about 50% to about 150% of a lubricating oil based on the dry weight of the colloid, homogenizing the mixture and spray drying it whereby a pulverulent product is formed.

2. A process for the preparation of an oil dispersible water-resistant gel comprising mixing a hydrogel of an inorganic silica-containing colloid with a hydrophobic surface-active agent and from about 50% to about 150% by weight, based on the weight of colloid, of a mineral lubricating oil, homogenizing the mixture so formed and spray drying it using a pressure differential between about 10 and about 100 pounds/per square inch, whereby a pulverulent product is formed.

3. A process for the preparation of a grease composition which comprises mixing a hydrogel of an amorphous inorganic colloid with from about 10% to about 100% by weight, based on the colloid, of a hydrophobic surface-active agent and from about 50% to about 150% based on the weight of colloid of a lubricating oil, spray drying the mixture so formed to produce a pulverulent material and dispersing it in a lubricating oil to form a grease composition containing from about 1% to about 20% by weight of the colloid.

4. In a process for the preparation of an oil dispersible water-resistant grease-forming gel of the group consisting of inorganic colloids, clays, and mixtures thereof, the steps comprising adding a hydrophobic surface-active agent and a hydrophobic oleaginous fluid to a colloidal dispersion comprising a liquid medium and colloidal particles of the group consisting of inorganic colloids, clays, and mixtures thereof and thereafter spray drying said mixture, whereby a composition comprising said gel, having said surface-active agent and oleaginous fluid dispersed thereon and therethrough is formed, the proportion of said agent being at least sufficient to form a monomolecular layer on 30–100% of the surface area of the gel and the oleaginous fluid is present in an amount between about 50% and about 150% by weight of the inorganic gel.

5. A pulverulent spray-dried product comprising an oil dispersible grease-forming inorganic amorphous gel having an average particle size less than about 5 microns, said gel being waterproofed with from about 10% to about 100% by weight based on the gel, of a hydrophobic surface-active agent and having dispersed thereon and therethrough from about 50% to about 150%, based on the weight of the gel, of an oleaginous fluid.

6. A composition of matter prepared as defined by the process of claim 1 comprising the following ingredients in the stated proportions:

|  | Parts by weight |
|---|---|
| Grease-forming silica gel having an average particle diameter less than about 5 microns | 100 |
| Hydrophobic cationic surface-active agent | 10–100 |
| Mineral lubricating oil | 50–150 |

7. A friable non-powdery composition of matter comprising the following ingredients in the stated proportions:

|  | Parts by weight |
|---|---|
| Grease-forming silica gel having an average particle diameter less than about 5 microns | 100 |
| Hydrophobic cationic surface-active agent | 10–100 |
| Mineral lubricating oil | 50–150 |
| Water | 2–50 |

8. A process for the preparation of a grease-forming composition suitable for ready dispersal in a lubricating oil to form a grease structure which comprises: admixing a hydrogel of an inorganic colloid with from about 10% to about 100% by weight, based on the colloid, of a hydrophobic surface-active agent and from about 50% to about 150% by weight of a lubricating oil, spray drying said ingredients to form a pulverulent composition containing from about 2 to about 20%, based on the colloid, of water and subjecting the water-containing composition to milling action to form a cohered friable non-powdery mass having a greater dispersibility in lubricating oil than before milling.

9. A composition of matter prepared in accordance with the process of claim 8 comprising the following ingredients in the stated proportions:

| | Parts by weight |
|---|---|
| Grease-forming inorganic colloidal gel | 100 |
| Hydrophobic surface-active agent | 10–100 |
| Lubricating oil | 50–150 |
| Volatile liquid having a boiling point lower than 125° C. at atmospheric pressure | 2–50 |

10. A grease-forming process which comprises forming a composition in accordance with the process of claim 8 and dispersing the same in a lubricating oil by stirring at a temperature at least 10° C. above the boiling point of water, the amount of milling required to obtain a grease structure being substantially less than if no water is present.

References Cited in the file of this patent

UNITED STATES PATENTS

| 2,554,222 | Stross | May 22, 1951 |
| 2,594,822 | Stross et al. | Apr. 9, 1952 |
| 2,599,683 | Abrams et al. | June 10, 1952 |
| 2,623,852 | Peterson | Dec. 30, 1952 |
| 2,623,853 | Stross | Dec. 30, 1952 |
| 2,626,241 | Sparks et al. | Jan. 20, 1953 |
| 2,626,899 | Abrams et al. | Jan. 27, 1953 |